(12) United States Patent
Bonnain et al.

(10) Patent No.: US 7,240,784 B2
(45) Date of Patent: Jul. 10, 2007

(54) SELECTION SYSTEM

(75) Inventors: Jean-Christophe Bonnain, Chateauroux (FR); Lilian Joseph, Ardentes (FR)

(73) Assignee: MeadWestvaco Packaging Systems, LLC, Glen Allen, VA (US)

( * ) Notice: Subject to any disclaimer, the term of this patent is extended or adjusted under 35 U.S.C. 154(b) by 0 days.

(21) Appl. No.: 10/865,381

(22) Filed: Jun. 10, 2004

(65) Prior Publication Data

US 2005/0061620 A1 Mar. 24, 2005

Related U.S. Application Data

(63) Continuation of application No. PCT/US02/39630, filed on Dec. 11, 2002.

(30) Foreign Application Priority Data

Dec. 11, 2001 (GB) .................................. 0129550

(51) Int. Cl.
*B65G 47/26* (2006.01)
(52) U.S. Cl. .................................... 198/459.2; 198/722
(58) Field of Classification Search ............. 198/419.2, 198/419.3, 459.2, 459.8, 460.1, 722, 459.1
See application file for complete search history.

(56) References Cited

U.S. PATENT DOCUMENTS

| | | | |
|---|---|---|---|
| 2,155,088 A | 4/1939 | Hopkins | |
| 2,406,123 A | 8/1946 | Zalkind | |
| 4,019,624 A | 4/1977 | Torres | |
| 4,227,606 A | 10/1980 | Bogatzki | |
| 4,469,217 A | 9/1984 | Meyer et al. | |
| 4,552,261 A * | 11/1985 | Raudat et al. | ........... 198/419.3 |
| 4,804,076 A | 2/1989 | Pace | |
| 4,938,341 A | 7/1990 | Bogatzki | |
| 5,699,651 A | 12/1997 | Miller et al. | |
| 5,718,323 A | 2/1998 | Flix | |
| 5,893,701 A * | 4/1999 | Pruett | ....................... 414/798.2 |
| 5,979,147 A | 11/1999 | Reuteler | |
| 6,808,062 B2 * | 10/2004 | Cerutti et al. | ................ 198/434 |

FOREIGN PATENT DOCUMENTS

| | | | |
|---|---|---|---|
| DE | 3241100 A | | 6/1984 |
| DE | 3529716 | | 5/1987 |
| FR | 2 491 039 A | | 4/1982 |
| FR | 2 802 191 A | | 6/2001 |
| GB | 1 589 540 | | 5/1981 |
| GB | 2 220 400 A | | 10/1990 |
| JP | 61-189023 | | 8/1986 |
| JP | 01220633 A | * | 9/1989 |
| JP | 04-089738 A | | 3/1992 |
| JP | 5319565 | | 12/1993 |
| WO | WO 144084 A2 | * | 6/2001 |

* cited by examiner

*Primary Examiner*—Mark A. Deuble
(74) *Attorney, Agent, or Firm*—Thomas A. Boshinski

(57) ABSTRACT

A selection apparatus for grouping articles in predetermined quantities from a moving stream of articles. The apparatus includes a horizontal rotating plate with three equally spaced arms and a lug assembly attached to an end of each arm. The plate rotates at a repeating velocity pattern enabling a lug assembly to be inserted between articles from the moving stream and a group of selected articles to be separated by a predetermined acceleration of the lug assembly.

22 Claims, 5 Drawing Sheets

SELECTION SYSTEM

This is a continuation of international application No. PCT/US02/39630, filed Dec. 11, 2002, which is hereby incorporated by reference.

BACKGROUND OF THE INVENTION

This invention relates, in general, to control of article position prior to packaging articles, and is more particularly concerned with separating groups of predetermined quantities of the articles from a continuous stream of articles.

U.S. Pat. No. 5,979,147 to Reuteler concerns a bottle grouping assembly and method for a packaging machine. The apparatus comprises a pair of rotatable selector wheel assemblies that rotate at constant velocity between which a double stream of bottles moves. The bottles are directed to the rotatable selector wheel assemblies and a finger attached to each rotatable selector wheel, engages a selected bottle and accelerates the bottle to a machine speed that is greater than the in-feed speed.

U.S. Pat. No. 5,718,323 to Flix illustrates a device for spacing products having carriages, each of which is capable of moving independently of the other carriages. Each carriage includes a grasping element for grasping products, individually or by lots, and a drive part for pulling the carriage on a guide rail. The grasping element and the drive part of each carriage are controlled by an electronic control box which enables spacing desired between two consecutive products to be achieved.

Both these references and the prior art refer to means for positioning or separating articles from the stream of articles and generally seek to address common problems associated with achieving consistency in the positioning or number of articles separated from the stream of articles. The present invention addresses the difficulties associated with providing versatility of operation from a single apparatus for separating articles from a stream of articles.

SUMMARY OF THE INVENTION

One aspect of the present invention provides apparatus for separating articles or for creating groups of articles in a moving stream of such articles. The apparatus comprises a rotatable body, at least one lug assembly carried by the rotatable body and a lug. The lug is movable away from the axis of rotation of the body into an operative position and thereafter is to retract during rotation of the body. The apparatus further includes means for rotating the body with a pre-determined cyclic variation such that the lug can engage between a pair of articles in the stream substantially at the velocity of the stream and thereafter at increased velocity to separate an article or articles downstream of the stream of articles from the other articles in the stream.

Preferably, the lug may be maintained in a substantially perpendicular arrangement relative to the article stream to improve its introduction between adjacent articles.

According to an optional feature of this aspect of the present invention the lug may be cam activated for movement into and away from the stream of articles.

According to another optional feature of this aspect of the present invention the lug assembly may be attached to a fixed arm of the rotating body.

According to a further optional feature of this aspect of the present invention the lug assembly may include a lug element coupled to a lug body via a lug shaft. The lug body may contain sliding means which contact the lug shaft, which supports at least one biasing means.

According to yet another optional feature of this aspect of the present invention there may be a single variable speed continuous belt to which the lug or lugs may be attached.

In one class of embodiments, the apparatus may further comprise a control means which operates the rotating body at the rotational velocity with the pre-determined cyclical variation.

Preferably, the control means may comprise means for receiving information regarding the speed of cartons in the feed path.

More preferably the control means may comprise a manual input means. Alternatively, the control means may comprise a sensor arranged to measure the speed of cartons in the feed path.

The apparatus may have a sensor arranged to measure the speed of the lug or lugs.

According to a further optional feature of this aspect of the present invention, the control means may vary the speed of the lug or lugs to lie within the range plus or minus 1–30% of the speed of the articles traversing the feed stream.

A second aspect of the present invention provides a method for separating articles or for creating groups of articles in a moving stream of such article. The method includes moving a lug assembly carried by a rotatable body away from the axis of rotation of the body into an operative position, and thereafter to retract during rotation of the body. The method further includes controlling the rotation of the body with a pre-determined cyclic variation such that the lug can engage between a pair of articles in the stream substantially at the velocity of the stream and thereafter, at increased velocity, separate an article or articles downstream from the other articles in the stream.

Preferably, the pre-determined cyclical variation is determined with reference to the size of an article, the velocity of the article, and a quantity of articles to be separated from the row of articles.

Preferably, the speed of an article in the stream may be received by a control means which controls the article separating apparatus. More preferably, the speed of the articles is sensed automatically.

According to an optional feature of this aspect of the present invention, the speed of each lug may be varied by the control means to lie within the range plus or minus 1–30% of the speed of the articles traversing the stream.

Advantageously, the present invention provides a system which mitigates problems, such as system down-time, that occur when constant velocity rotating selection systems are required to perform a modified task, such as, selecting a different quantity of articles, or accounting for an altered in-feed or out-feed speed.

The present invention is generally applicable to controlling the position of articles in the proximity of the selection apparatus and, whilst being particularly applicable to grouping articles from a moving stream of articles prior to packaging, may be employed more widely.

BRIEF DESCRIPTION OF THE DRAWINGS

Exemplary embodiments of the present invention will now be described by way of example only and with reference to the accompanying drawings, in which.

DETAILED DESCRIPTION OF THE PREFERRED EMBODIMENTS

Figure 1:
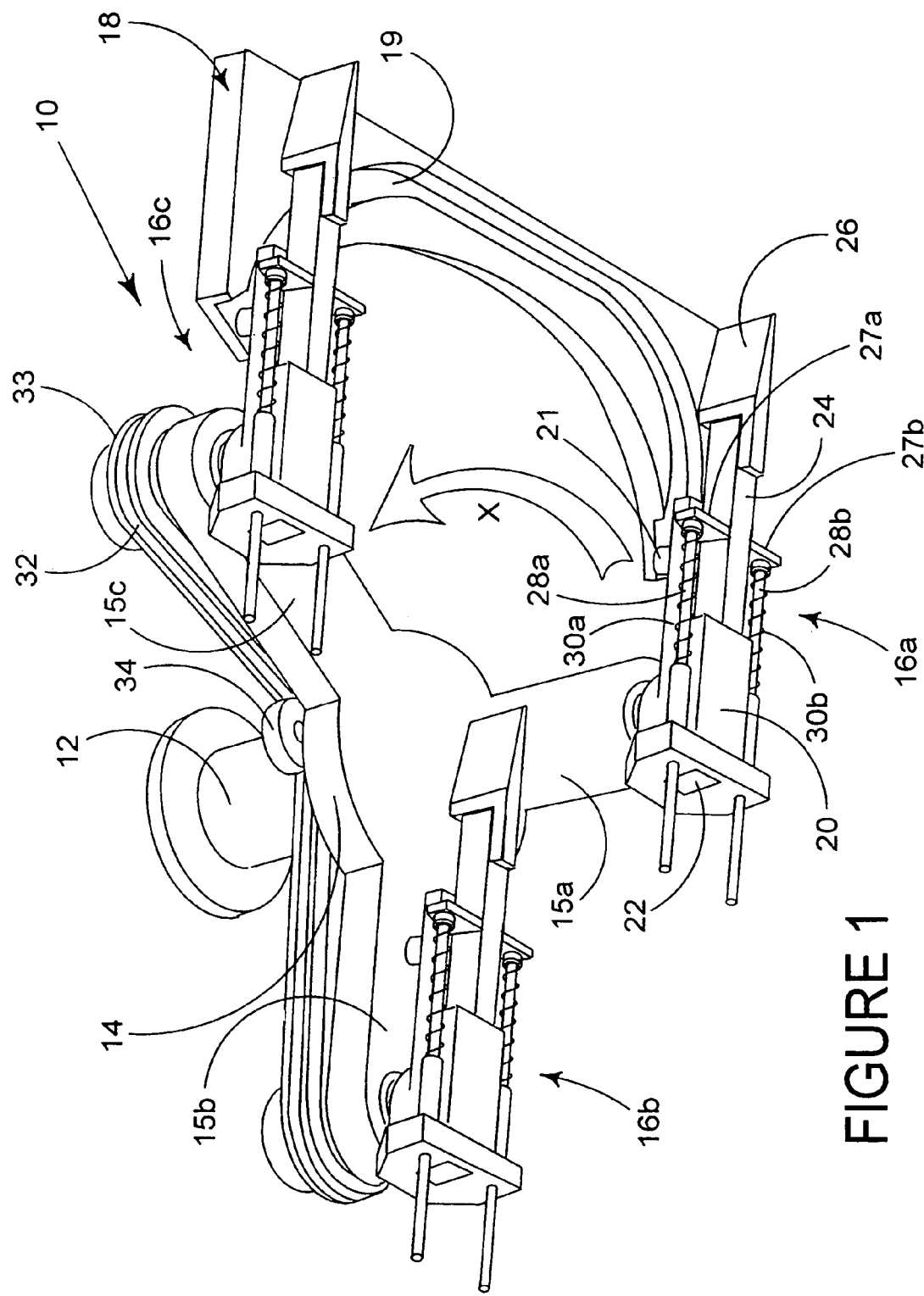
FIG. 1 is an illustration of a selection apparatus (viewed from below and to one side) constituting a first embodiment of the present invention.

FIG. 1 illustrates a selection apparatus 10 comprising a rotatable plate 14 which has a plurality of radially extending arms. In this embodiment there are three arms 15a, 15b, 15c that are equally spaced apart about the circumference of the plate. An underside of an outermost end of each arm pivotally interfaces with a lug assembly 16a, 16b, 16c. Located on a topside of the outermost end of each arm is a device means which, in this embodiment, is provided by a belt guide 33 around which an endless belt 32 is fed. The belt 32 is also fed around at least one idler 34 which is mounted on a central body of the rotatable plate 14. The rotatable plate 14 is pivotally mounted on the lowermost end of a central shaft 12.

Each of the three lug assemblies 16a, 16b, 16c identically comprises a wedge-shaped lug element 26 connected to a lug body 20 via a lug shaft 24. Each lug assembly 16a, 16b, 16c is oriented such that lug element 26 points in the same direction. With reference to the lug assembly 16a, as illustrated on FIG. 1, a protrusion 27a from a near-face of the lug shaft 24 is coupled to a first end of a horizontally positioned pin 28a. Similarly, a protrusion 27b from a far-face of the lug shaft 24 is coupled to a first end of a pin 28b. A middle section of the pins 28a, 28b is spring loaded along a side of the lug body 20 by means of suitable resilient biasing means. For example, a coil spring 30a surrounds the pin 28a, and is secured at the first end of the pin 28a and also to the lug body 20. A second end of both pins 28a and 28b protrudes from a back face 22 of the lug body 20. A cam follower 21 is attached to an uppermost face of the lug shaft 24. Each of the lug assemblies 16a, 16b, 16c is constantly orientated with the lug element 26 protruding towards, and normally to, a stream of bottles, or other articles conveyed along a platform 36 (FIG. 2).

A mechanical cam 18 is situated in close proximity to the rotatable plate 14. Furthermore, the mechanical cam 18 is situated at approximately the same vertical level as the rotatable plate 14 such that the cam follower 21 of each lug assembly 161, 16b, 16c sequentially engages with a cam track 19 in the underside of the mechanical cam 18 as the plate 14 rotates.

Figure 2:
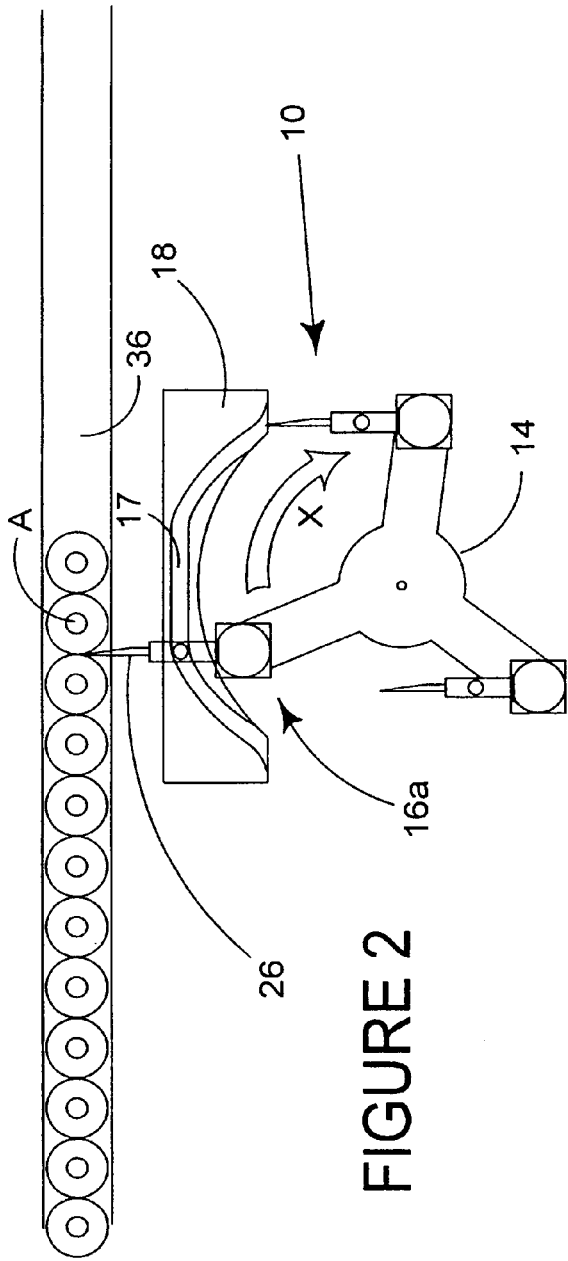
FIG. 2 shows an illustration of the selection apparatus of FIG. 1 after a first operation period.

In operation, a motor assembly (not illustrated) drives the rotatable plate 14 via the central shaft 12 in direction "X", i.e., clockwise, as viewed above in FIG. 2. As each arm of the rotatable plate 14 moves towards a far end of the mechanical cam 18, the cam follower 21 engages with the far end of the cam track 19. Thus, each lug assembly 16a, 16b, 16c, in turn, is guided through the cam track 19. The selection apparatus (including the mechanical cam 18) is situated alongside an article path 36 such that a straight middle section 17 of the cam track 19 runs parallel and closest to the article path 36. With reference to FIG. 2, articles on the associated article path 36 move from left to right. The lug element 26 is shaped so that it may be urged smoothly between articles or between selected groups of articles.

In operation, movement of the lug element 26, relative to the lug body 20 and perpendicular to the article path, is against the spring loading of the springs 30a, 30b. When the lug shaft 24 is urged from a rest position (caused by the cam follower 21 moving through cam track 19), the springs 30a, 30b are deformed and a slidable means located within the lug body 20 enables the shaft to move smoothly out of the body.

Figure 3:
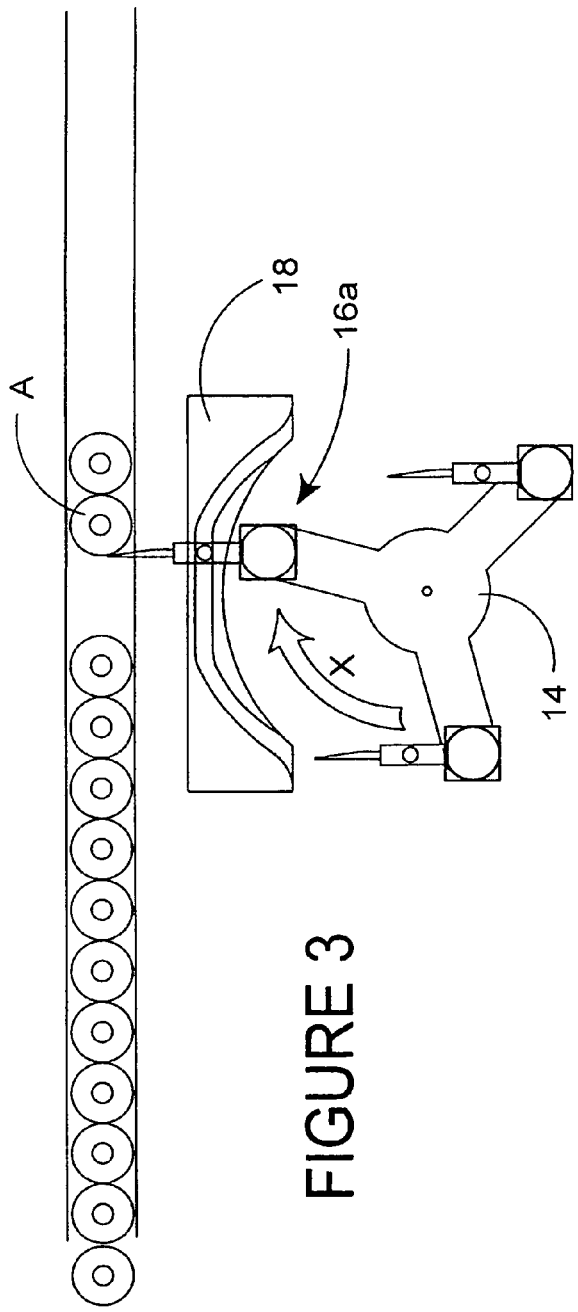
FIG. 3 shows an illustration of the selection apparatus of FIG. 1 after a second operation period.
Figure 4:
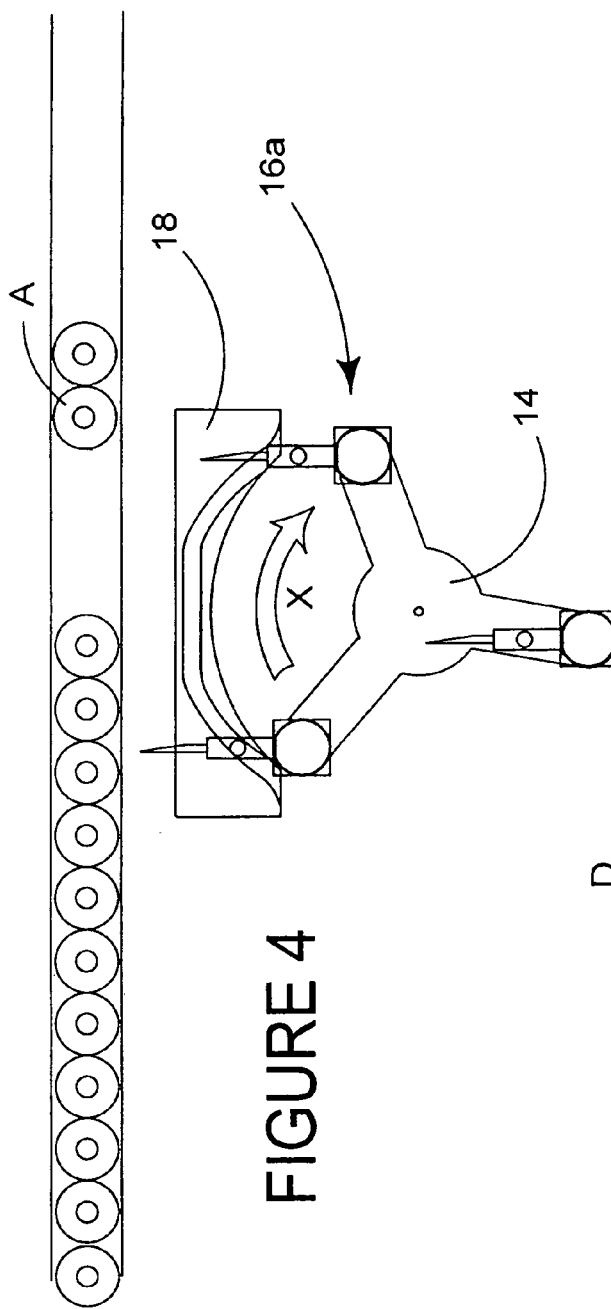
FIG. 4 shows an illustration of the selection apparatus of FIG. 1 towards the end of a third operation period.

FIGS. 2, 3 and 4 show a plan view of the selection apparatus 10 of the present invention and an article path 36 guiding a stream of bottles A from the left-hand side to the right-hand side of each figure. The in-feed stream of bottles is moving at an approximately constant velocity. Specifically, FIGS. 2 and 3 show the lug assembly 16a of selection apparatus 10 at the end of a first and second operation period respectively, and FIG. 4 shows the lug assembly 16a towards the end of a third operation period.

Figure 2A:
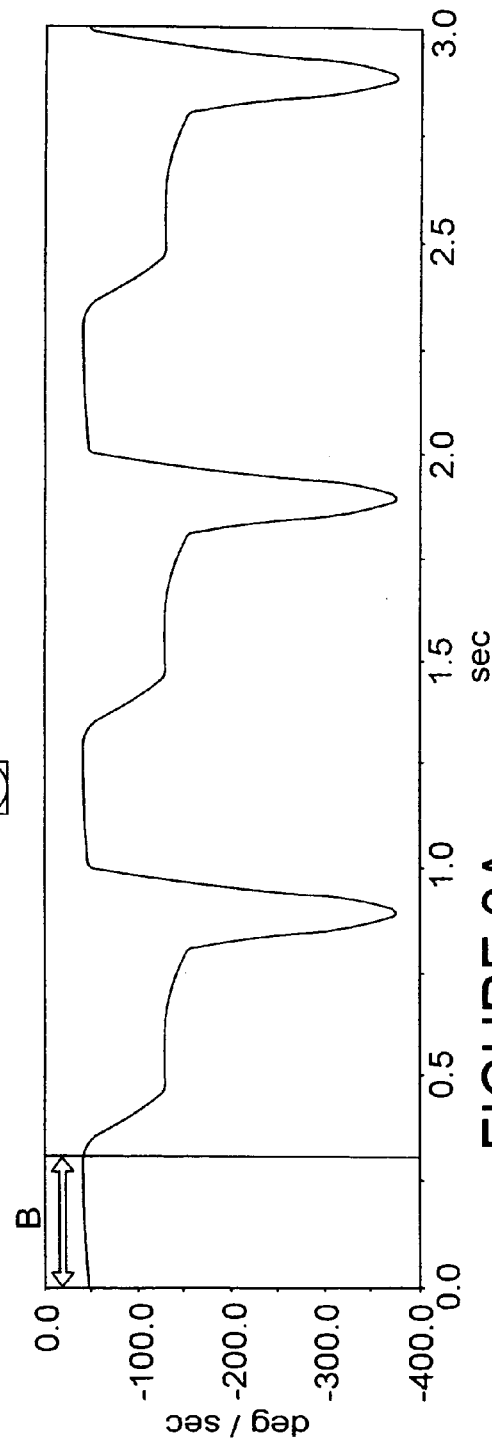
FIG. 2a is a graph showing velocity of a lug of the selection apparatus with the first operation period indicated.
Figure 3A:
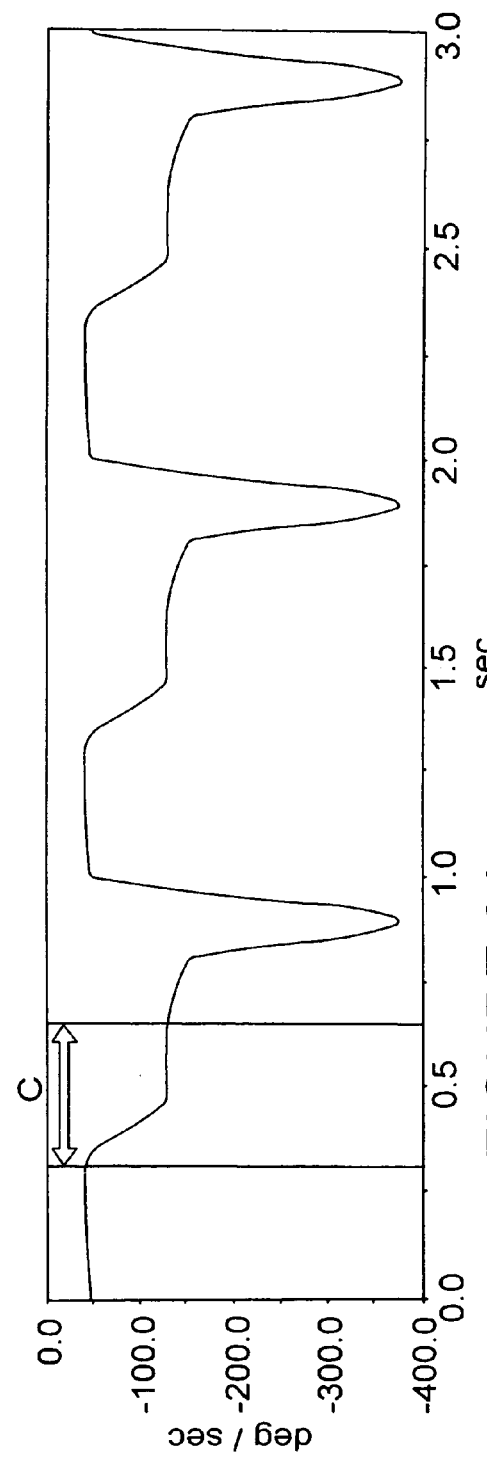
FIG. 3a is a graph showing velocity of the lug of the selection apparatus with the second operation period indicated.
Figure 4A:
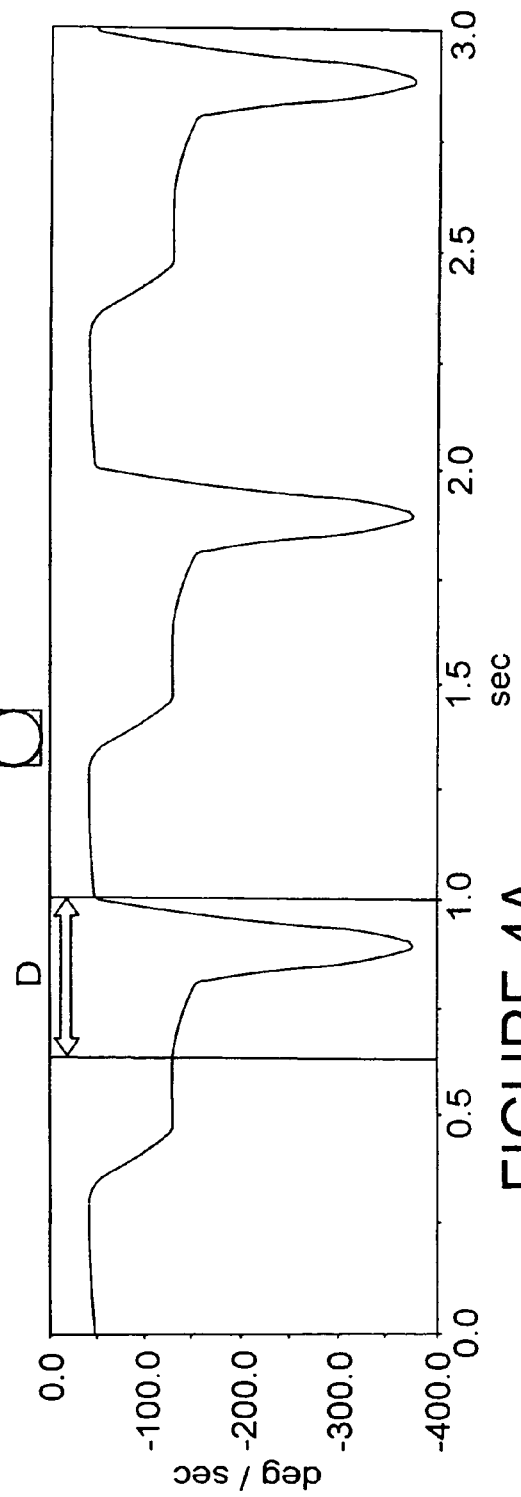
FIG. 4a is a graph showing velocity of the lug of the selection apparatus with the third operation period indicated.

FIGS. 2a, 3a and 4a are graphs showing the velocity of the lug assembly 16a, indicating the first, second and third operation periods B, C, D, respectively. During the first operation period, the velocity component parallel to the article path 36 of the lug assembly 16a, is substantially similar to the velocity of the stream of bottles A. Therefore, the lug element 26 of the lug assembly 16a may be urged between two bottles (as shown in FIG. 2) with minimal disturbance to the stream of bottles A.

During the second operation period, the velocity component parallel to the article path 36 of the lug assembly 16a comprises two aspects. Initially, the lug assembly 16a accelerates to a velocity greater than the in-feed velocity of the stream of bottles and subsequently maintains that greater velocity briefly. As illustrated in FIG. 3, bottles in the article stream to the right-hand side of the lug element 26 are thereby separated from the article stream which continues to advance at a lower velocity.

During the third operation period shown in FIG. 4, the velocity component parallel to the article path 36 of the lug assembly 16a comprises three aspects. The lug assembly 16a accelerates gradually, then rapidly accelerates to its peak velocity, and then rapidly decelerates to the in-feed velocity of the stream of bottles. Thus, initially, the lug assembly 16a is removed from contact with the bottles and the rapid acceleration is required to move the second lug assembly 16b to the start of the first operation period due to the cyclical nature of the rotational velocity of selection assembly 10. In the present embodiment, each operation period lasts approximately 0.3 seconds. It will be apparent to the skilled man that FIG. 4 illustrates the position of the lug assembly 16a approximately 0.9 seconds after the first operation period began.

Figure 5:
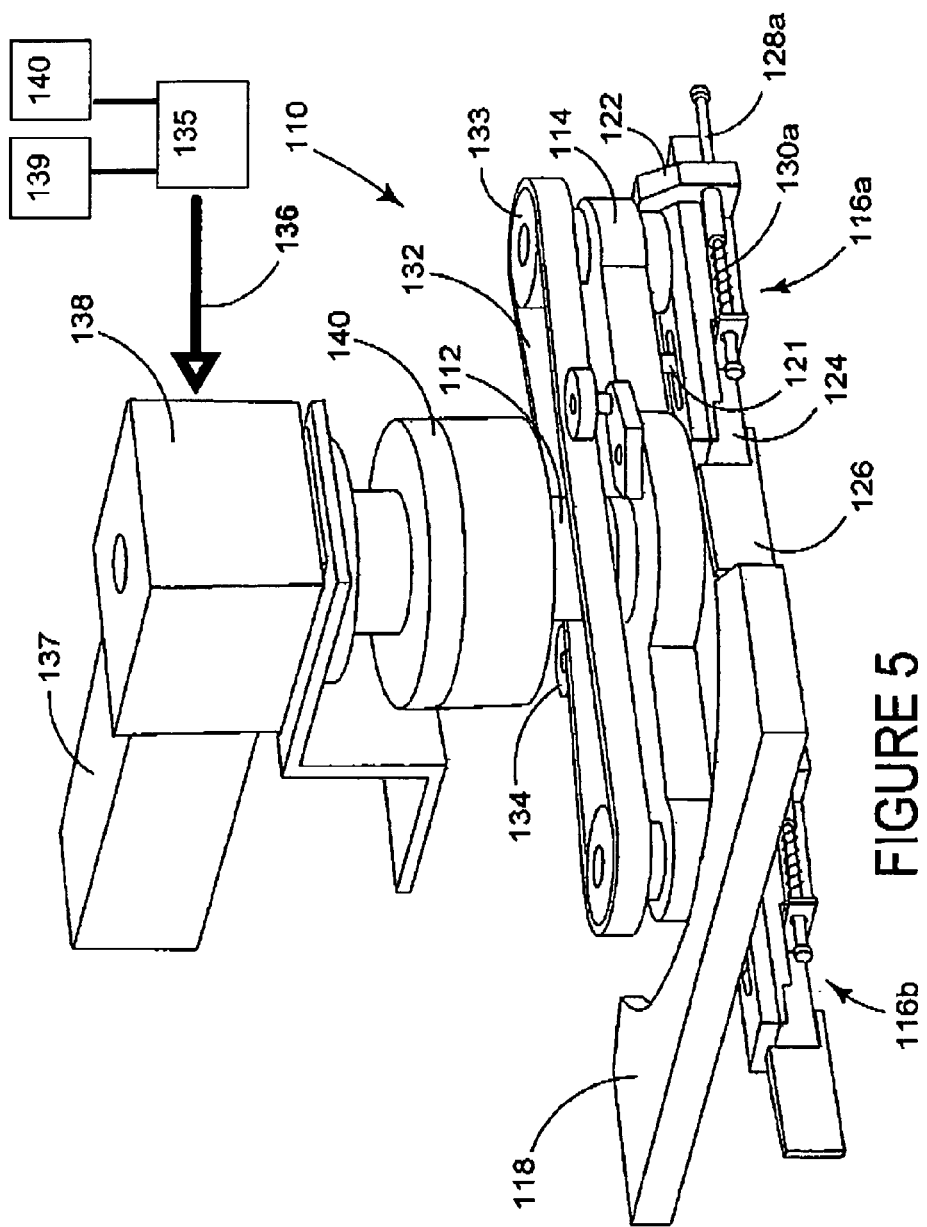
FIG. 5 is an illustration of a selection apparatus (viewed from above and to one side) constituting a second embodiment of the present invention.

FIG. 5 illustrates a second embodiment of a selection apparatus 110. The reference numerals utilized generally indicate like components to the reference numerals of FIG. 1 except that the reference numerals are preceded by a "1". Only certain differences between the first and second embodiments will be hereinafter described. A rotating plate 114 of the second embodiment of the selection apparatus 110 has two (as opposed to three in the first embodiment) arms 115*a*, 115*b* spaced at 180 degrees. An underside of an outermost end of each arm 115*a*, 115*b* pivotally interfaces with a lug assembly 116*a*, 116*b* which is modified as compared to the lug assemblies 16*a*, 16*b*, 16*c* of FIG. 1. Specifically, a pin 128*a* (and a pin 128*b* not illustrated) has a stop at both ends and a lug shaft 124 is shorter than the lug shaft 24 of FIG. 1.

A part of a suitable bearing structure 140 is attached to an upper end of a central shaft 112 to a support the selection apparatus 110. Positioned above the part of the bearing structure, 140, but with a control connection to the central shaft 112, is a motor assembly 137, 138.

In operation, the lug assemblies 116*a*, 116*b* of the selection apparatus 110 will be subject to velocity changes similar to the velocity changes experienced by the lug assemblies 16*a*, 16*b*, 16*c* in the first embodiment of the present invention. Clearly, modifications will be necessary. For example, the velocity peak of the third operation period will be altered in order that the lug assembly 116*a*, 116*b* can be moved into position at the start of the cam track (not shown) once the other lug assembly 116*b*, 116*a* has reached the end of the cam track.

Importantly, the operation of both the first and second above described embodiments are generally controlled by a microprocessor, 135. It is not usually necessary for the microprocessor, 135 to be situated within the selection apparatus 10, 110. Instead, the microprocessor 135 is located away from the selection apparatus 10, 110 and has a control connection 136 to the motor assembly 137, 138. Specifically, the rotational velocity of the rotatable plate 14, 114 during the first, second and third operation periods, is determined by control data from the microprocessor 135, which is input to the motor assembly 138. Advantageously, the control data may be varied by a user of the selection apparatus 10, 110 in order to enable various modes of apparatus operation. For example, it is envisaged that numerous velocity patterns during the first, second and third operation periods may be utilized. Also, a seamless transition between differing velocity patterns may be realized in order to accommodate a change in the in-feed velocity of articles on the article path, in the size or type of articles, in the spacing between in-feed articles, or in the article grouping ultimately required.

Changes to the control data may be initiated either by a user inputting information concerning the articles into the microprocessor or, alternatively, by an article sensing means positioned at the article in-feed path which could send data to the microprocessor. The data from the article sensing means 140 may include details of article size and weight, gaps between articles, or other irregularities which may occur.

It is envisaged that the present invention may be made commercially available as an integral part of a system for selecting and packaging as well as separately supplied on a retrofit basis.

It will be appreciated that the above description has been given by way of example only and that modifications in detail may be made within the scope of the invention. For example, the slidable means within lug body 20 may be any suitable mechanism to allow the lug shaft 24 to move smoothly back and forth, such as a system of rollers. Also, the springs 30*a*, 30*b*, 130*a*, 130*b* located in the lug assemblies 16*a*, 16*b*, 16*c*, 116*a*, 116*b* may be replaced by any suitable biasing means. As will be recognized by those skilled in the art, the invention may also be realized with one arm, or four or more arms.

It will be understood that selection apparatus of different sizes may be required depending upon how they are deployed, and similarly, motor assemblies of different powers may be required dependant upon the size of the selection apparatus and the weight of the articles.

What is claimed is:

1. An apparatus for separating articles to create groups of articles in a moving stream of articles, the apparatus comprising:
    a rotatable body;
    at least one lug assembly carried by the rotatable body and having a lug movable away from the axis of rotation of the body into an operative position and thereafter to retract during rotation of the body;
    a single variable speed continuous belt to which the lug assembly is connected; and
    means for rotating the rotatable body with a pre-determined cyclic variation such that the lug can engage between a pair of articles in said stream substantially at the velocity of the stream and thereafter at increased velocity to separate an article or articles downstream of the stream of articles from the other articles in the stream.

2. The apparatus according to claim 1, wherein the lug is maintained in a substantially perpendicular arrangement relative the article stream to improve its introduction between adjacent articles.

3. The apparatus of claim 1, further comprising a control means for operating the rotatable body at the rotational velocity with the pre-determined cyclical variation.

4. A method for separating articles to create groups of articles in a moving stream of articles, the method comprising:
    moving a lug of one or more lug assemblies connected to a single variable speed continuous belt and carried by a rotatable body away from the axis of rotation of the body into an operative position and thereafter to retract during rotation of the rotatable body; and
    controlling the rotation of the rotatable body with a pre-determined cyclic variation such that the lug can engage between a pair of articles in said stream substantially at the velocity of the stream and thereafter at increased velocity to separate an article or articles downstream of the stream of articles from the other articles in the stream.

5. The method of claim 4, wherein the pre-determined cyclical variation is determined with reference to: a size of the article, a velocity of the article, and a quantity of articles to be separated from the row of articles.

6. The method of claim 5, wherein the speed of an article in said stream is received by a control means which controls the article separating apparatus.

7. The method of claim 6, wherein the speed of the lug is varied by said control means to lie within the range plus or minus 1-30% of the speed of the articles traversing said stream.

8. An apparatus for separating articles into groups in a moving stream of articles, the apparatus comprising;
    a rotatable body having a single axis of rotation;
    a lug assembly pivotably carried by said rotatable body, said lug assembly including a retractable lug;
    means for rotating the rotatable body with a predetermined cyclically variable rotational velocity;
    means for orienting said retractable lug such that said retractable lug is substantially normal to the moving stream of articles; and
    means for guiding retraction of said retractable lug to control its insertion into and translation with respect to the moving stream of articles.

9. The apparatus of claim 8, wherein said single axis of rotation is defined by a rotating shaft.

10. The apparatus of claim 8, further comprising an arm extending from said rotatable body and radially with respect to said axis of rotation;
wherein said lug assembly is pivotably mounted on said arm.

11. The apparatus of claim 8, wherein said means for rotating the rotatable body comprises a servo motor.

12. The apparatus of claim 8, further comprising a cam follower connected to said retractable lug; wherein:
said means for guiding retraction of said retractable lug comprises a cam track a section of which is aligned with a portion of the moving stream of articles; and
said cam follower is positioned in relation to said retractable lug so as to engage said cam track during a portion of each revolution of said rotatable body.

13. The apparatus of claim 12, wherein said aligned section of said cam track is shaped and positioned with respect to said retractable lug and with respect to said aligned portion of the moving stream of articles so as to maintain said retractable lug in a translational path within the aligned portion of the moving stream of articles for a predetermined interval during each revolution of said rotatable body.

14. The apparatus of claim 8, wherein said means for orienting said retractable lug further orients said retractable lug such that said retractable lug is substantially biased toward the moving stream of articles.

15. The apparatus of claim 8, wherein said means for rotating the rotatable body with a predetermined cyclically variable rotational velocity is further for continuously rotating the rotatable body.

16. An apparatus for separating articles into groups in a moving stream of articles, the apparatus comprising;
a rotatable body having a single axis of rotation;
a lug assembly pivotably carried by said rotatable body, said lug assembly including a retractable lug:
means for rotating the rotatable body with a predetermined cyclically variable rotational velocity;
means for continuously orienting said retractable lug such that said retractable lug is substantially normal to the moving stream of articles, wherein said means for continuously orienting said retractable lug comprises a continuous belt associated with said lug assembly so as to limit deflection of said retractable lug with respect to said axis of rotation of said rotatable body; and
means for guiding retraction of said retractable lug to control its insertion into and translation with respect to the moving stream of articles.

17. A method for separating articles into groups in a moving stream of articles, the method comprising:
rotating a rotatable body about a single axis of rotation with a predetermined rotational velocity that varies cyclically during each revolution of said rotatable body;
biasing a retractable lug using an orienting means associated with a lug assembly that is pivotably carried by said rotatable body, said lug assembly comprising said retractable lug;
engaging a cam follower associated with said retractable lug with a cam track having a section that is aligned with a portion of the moving stream of articles, wherein engaging said cam follower with said cam track retracts said retractable lug so as to control its insertion between two of said articles and its translation with respect to said aligned portion of the moving stream of articles; and
increasing the rotational velocity of said rotational body after insertion of said retractable lug between said two of said articles so as to create a separation between said two of said two articles.

18. The method of claim 17, wherein controlling insertion of said retractable lug comprises adjusting the rotational velocity of said rotational body so as to substantially equalize the translational velocity of said retractable lug with the velocity of said two of said articles in said moving stream of articles.

19. The method of claim 17, wherein the pre-determined cyclical variation is determined with reference to: a size of the article, a velocity of the article, and a quantity of articles to be separated from the row of articles.

20. The method of claim 18, wherein the velocity of said two of said articles is sensed by a control means that controls the rotation of the rotatable body accordingly.

21. The method of claim 20, wherein the translational velocity of said retractable lug is varied by said control means to lie within the range of plus or minus 1–30% of the velocity of said two of said articles.

22. The method of claim 17, wherein biasing said retractable lug using an orienting means comprises using a continuous belt.

* * * * *